(No Model.)  2 Sheets—Sheet 1.
R. S. RUST.
TRUCK.
No. 529,960. Patented Nov. 27, 1894.
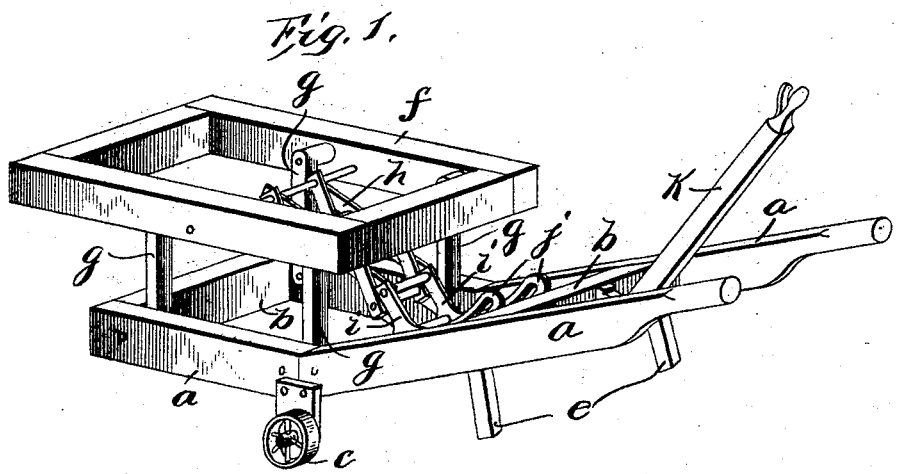
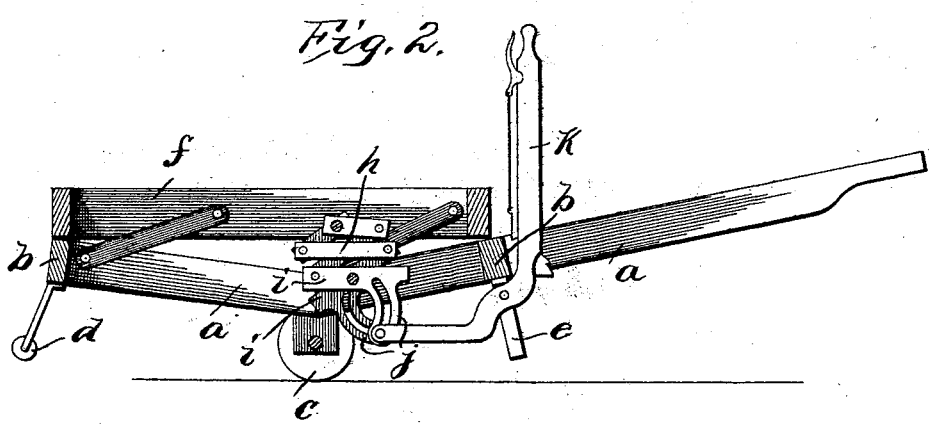
WITNESSES:
E. E. Duffy
Hubert D. Peck
INVENTOR
R. S. Rust
BY O. E. Duffy
ATTORNEY.
THE NORRIS PETERS CO., PHOTO-LITHO., WASHINGTON, D. C.

(No Model.) 2 Sheets—Sheet 2.
R. S. RUST.
TRUCK.
No. 529,960. Patented Nov. 27, 1894.
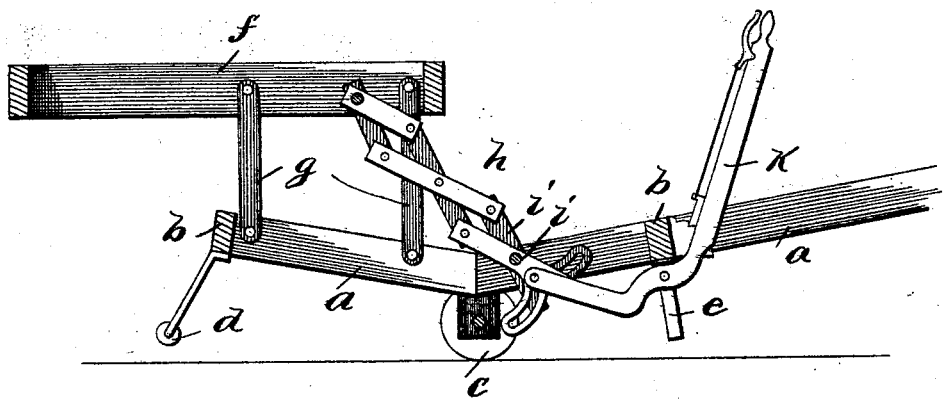
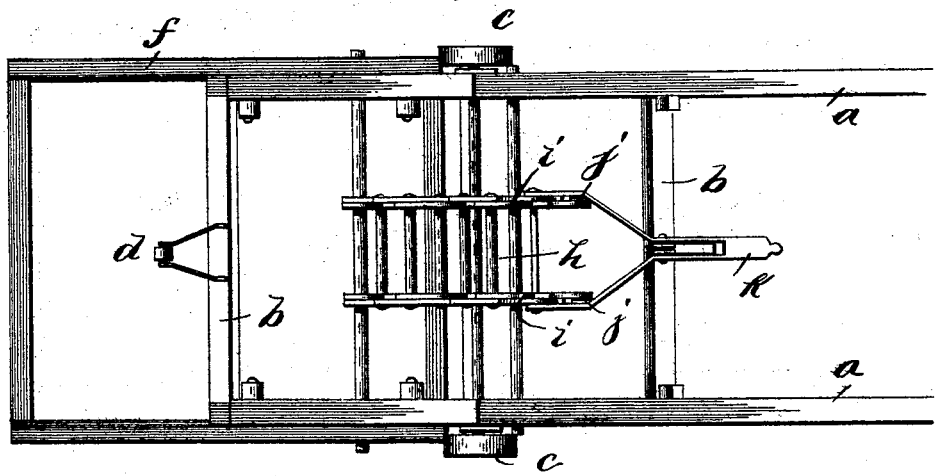
WITNESSES:
E. C. Duffy
Hubert D Peck
INVENTOR
R. S. Rust
BY O. E. Duffy
ATTORNEY.

UNITED STATES PATENT OFFICE.

ROBERT S. RUST, OF DELAPLANE, VIRGINIA, ASSIGNOR OF ONE-FOURTH TO GEORGE W. CHANCELLER, OF SAME PLACE.

TRUCK.

SPECIFICATION forming part of Letters Patent No. 529,960, dated November 27, 1894.

Application filed April 7, 1894. Serial No. 506,755. (No model.)

*To all whom it may concern:*

Be it known that I, ROBERT S. RUST, of Delaplane, in the county of Fauquier and State of Virginia, have invented certain new and useful Improvements in Trucks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in trucks.

The object of the invention is to provide an improved baggage truck having a vertically movable platform, cheap, simple, durable and easily operated means for controlling the platform and holding it in the desired vertical adjustment.

The invention consists in certain novel features of construction and in combination of parts more fully and particularly described hereinafter and pointed out in the claims.

Referring to the accompanying drawings:—

Figure 1, is a perspective view showing the platform elevated. Fig. 2, is a side elevation with the platform lowered and the side of the truck broken away. Fig. 3, is a similar view showing the platform elevated. Fig. 4, is a bottom plan view.

In the drawings the reference letter $a$, indicates the side bars or beams of the truck having the usual rearwardly extending handles, these side beams being suitably secured together by cross beams $b$, as usual. The truck is provided with the usual supporting wheels $c$, arranged approximately beneath the center of weight. The truck can be provided with the forwardly extending arms carrying the caster wheel $d$, and can also be provided with the supporting legs or standards $e$, the caster wheels and standards being so arranged that the truck can be entirely supported by the main supporting wheels if desired when being moved.

$f$, is the vertically movable platform which carries the baggage and which in its lowered position rests on the upper surface of the truck beams proper.

$g$, indicates links at the lower ends pivoted to the truck proper and at their upper ends pivotally joined to the vertically movable platform so that when the platform is in its lowered position the links are arranged within the sides of the platform and the truck proper; and when the platform is elevated the links swing upwardly with the same and support the platform.

The lazy tongs $h$, are at their upper ends pivotally joined to the cross bar carried by the vertically movable platform and at their lower ends are pivoted to the cross bar arranged between the sides of the truck proper so that when the platform is in its lowered position, the lazy tongs are folded together between the cross bars, and when the platform is elevated said tongs are extended.

The lower levers $i$, of the tongs are extended downwardly below their fulcrum point on said cross bar and the lower ends of said levers are provided with the laterally extending arms $j$, the arms or levers located together being extended in opposite directions so that the levers will be moved in opposite directions by the means hereinafter described. These arms are provided with the curved slots extending longitudinally thereof, substantially as shown.

$k$, is a lever extending upwardly at the rear end of the truck and suitably pivoted or fulcrumed to the rear cross bar thereof. This lever is provided with a forward extending nose, extending beneath the cross bar of the said slotted arms, the nose of the lever having lugs or a cross rod extending into said slots. If desired this rod can carry anti-friction rollers located in the slots of the arms. A suitable pawl and ratchet mechanism is provided to hold this upright hand lever and the vertically movable platform in the desired adjustment. Thus it will be seen that when the upper end of said lever is swung rearwardly and downwardly the nose of the lever will swing up and will thereby draw the slotted arms of the lazy tongs together and by each other until the rod carried by the lever reaches the inner ends of the slots. This action draws the levers of the lazy tongs together and thereby expands the same and elevates the platform to the desired height.

When the lever is swung in the opposite direction the nose thereof is thrown down and the slotted arms of the lazy tongs are separated thereby folding the tongs together and lowering the platform.

The extreme simplicity, strength and durability of this invention are obvious. It will be evident that it can be very easily operated and the platform can be held in the desired vertical position.

It is evident that various changes might be made in the forms, arrangements and constructions of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. In a truck, the combination of the truck proper, the vertically movable platform thereon, links supporting said platform, the lazy tongs pivotally joined to the platform and the truck frame and having their lower levers provided with lateral arms having grooved slots and the operating levers fulcrumed to the truck frame and provided with the pawl and ratchet holding mechanism and having the nose provided with the rod extending into said slot, substantially as described.

2. A truck having the lazy tongs for raising and lowering its vertically movable platform and a controlling lever fulcrumed to the truck frame, the lazy tongs having grooved guides, substantially as set forth and the lever having means extending into said guides and whereby the movements of the lever will expand and contract the lazy tongs through the medium of said guides, substantially as described.

In testimony that I claim the foregoing as my own I affix my signature in presence of two witnesses.

ROBERT S. RUST.

Witnesses:
B. B. SCOTT,
JNO. M. SCOTT.